US005576493A

United States Patent [19]

Sowinski

[11] Patent Number: 5,576,493
[45] Date of Patent: *Nov. 19, 1996

[54] METHOD AND MEANS FOR FILTERING CONTAMINANTS FROM A GAS STREAM TO DETECT FILTER CONDITION IN SITU

[76] Inventor: Richard F. Sowinski, 996 Arnold Dr., Martinez, Calif. 94553

[*] Notice: The term of this patent shall not extend beyond the expiration date of Pat. No. 5,437,180.

[21] Appl. No.: 479,647

[22] Filed: Jun. 7, 1995

Related U.S. Application Data

[63] Continuation of Ser. No. 155,951, Nov. 19, 1993, Pat. No. 5,437,180.
[51] Int. Cl.$^6$ .................................................. G01L 13/00
[52] U.S. Cl. .................................................. 73/708; 73/724
[58] Field of Search ........................... 340/607, 608, 340/690, 626, 614; 73/708, 40.5 R, 4 R, 724; 95/127

[56] References Cited

U.S. PATENT DOCUMENTS

| | | | |
|---|---|---|---|
| B 530,709 | 4/1976 | Covington et al. | 73/40.5 R |
| 3,611,337 | 10/1971 | Balzer et al. | 340/607 |
| 4,043,355 | 8/1977 | Cerruti et al. | 73/40.5 R |
| 4,051,715 | 10/1977 | Ledeen et al. | 73/40.5 R |
| 4,198,855 | 4/1980 | Tsujikura | 73/40.5 R |
| 4,604,899 | 8/1986 | Yamada et al. | 73/708 |
| 4,645,887 | 2/1987 | Whiting | 340/607 |
| 4,656,871 | 4/1987 | Czarnocki | 73/724 |
| 4,667,516 | 5/1987 | Schulz | 73/708 |
| 4,796,466 | 1/1989 | Farmer | 73/40.5 R |
| 4,798,093 | 1/1989 | Kenoun | 73/708 |
| 4,895,018 | 1/1990 | Asbra | 73/40.5 R |
| 4,918,426 | 4/1990 | Butts et al. | 340/607 |
| 4,998,434 | 3/1991 | Asbra | 73/40.5 R |
| 5,050,423 | 9/1991 | Czarnocki | 73/4 R |
| 5,149,343 | 9/1992 | Sowinski | 95/127 |
| 5,193,393 | 3/1993 | Czarnocki | 73/708 |

Primary Examiner—Richard Chilcot
Assistant Examiner—Ronald Biegel
Attorney, Agent, or Firm—Harold D. Messner

[57] ABSTRACT

A detector system and method are described for accurately indicating filter capacity of a filter assembly positioned within the piping network owned by the end user, includes the steps of: (a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the natural gas stream coupled with surprising longevity of the in situ contaminant, is filtered from the gas stream and captured, (b) passing an unfiltered sample of natural gas stream and a filtered sample of such stream to the detector system of the invention wherein capacity of the filter assembly located within the end user-customer's piping network is indicated, and (c) activating an indicating means to indicate to the end user the need to change the filter within the filter assembly, by generation of a drive signal whereby inappropriate and unsafe operations of customer's appliances are avoided. The detection system uses a piezoresistive sensor which measures differential pressures between the unfiltered and filtered natural gas samples entering the sensor to provide a pair of output signals with the difference between these signals being related to the filter capacity.

5 Claims, 5 Drawing Sheets

METHOD AND MEANS FOR FILTERING CONTAMINANTS FROM A GAS STREAM TO DETECT FILTER CONDITION IN SITU

RELATED APPLICATIONS

This Application is a continuation-in-part of Ser. No. 8/155,951 for "DETECTION OF NATURAL GAS WITHIN A CUSTOMER'S DOMAIN" filed Nov. 19, 1993, now U.S. Pat. No. 5,437,180 issued Aug. 1, 1995 hereby incorporated by reference.

SCOPE OF THE INVENTION

The present invention relates to a method of filtering in association with detection of filter condition. More particularly, it relates to a filtering and detection method within the domain owned by a natural gas customer, say within the gas piping network owned by the end user-customer, such system or network being found between the gas meter maintained and owned by the natural gas supplier and the appliances owned and operated by the gas customer. Purpose: to eliminate natural gas contaminants concentrated within the piping network upstream of the filter assembly at sufficient levels to affect—nonlinearly—the operation of the filter assembly. As a further constraint, the sources of such contaminant concentration are identified. It is believed they result from aperiodic loading of such network in which contaminants become clumped into packets due to dampening effects of the compressor driven network and multiple customer outlet usage that adds the aforementioned aperiodic loading within the network.

DEFINITIONS

In this Application, "natural gas" means a mixture of gases associated with hydrocarbon accumulation within the earth as well as processed fuel gases derived from petroleum as well as mineral products such as coal in either gas or liquid phases. In some gas line networks, the resulting final gases may be a mixture from these two sources but wherein the essential component consists of methane.

"Contaminates within the natural gas stream sufficient to be a threat to detector operation" means contaminants within the natural gas that are recognized to inhibit seismic detector operations, such as dust, rust, moisture, oil, tars, olefines, odorants, oxides, etc.

"Adsorption" means filter media that captures molecules of a gas, liquid or dissolved substance to the filter surface, by adhesion.

"Absorption" means filter media that absorbs molecules of a gas, liquid or dissolved substance to the filter itself, by taking in through pores or interstices.

"Impingement" means filter media that captures molecules of a gas, liquid, solid or a dissolved substance to the filter by physical capture such as by change in velocity.

BACKGROUND OF THE INVENTION

In my copending application, Ser. No. 155,951 for "DETECTION OF NATURAL GAS WITHIN A CUSTOMER'S DOMAIN" filed Nov. 19, 1993, now U.S. PAT. NO. 5,437,180 issued Aug. 1, 1995 hereby incorporated by reference, I teach that the temperature of the gas stream entering the end user's internal piping system has been found to be fairly stable (at about 50 degree F) while the temperature of the end user's internal piping system (irrespective of total length) has been found to vary as a function of the ambient temperature exterior of the end user's internal piping system. Each of such temperatures can thus be used in association with a differential pressure sensing and conditioning circuit that uses a piezoresistive pressure sensor which measures differential pressures between the natural gas and ambient air entering the transducer to provide a pair of output signals, wherein the conditioned difference between these signals is related to the magnitude of flow of the natural gas based on sensed temperature changes at measured by first and second thermistors.

In such a sensor, there is provided four piezoresistive elements in or on a flexible diaphragm. Two ports are provided to provide ambient air and natural gas samples. When the diaphragm is flexed because of differential pressure, a stress is placed on the piezoresistive elements, causing them to change resistance. The resistance of such elements at any one time, is an accurate indication of differential pressure. But since both the resistance of the piezoresistive elements and its sensitivity to change as a function of stress, are dependent on a clean interface for natural gas passage, contamination due to impurities in the natural gas can unduly affect accuracy of results.

Consequently, there is clear necessity that the capacity of the filter assembly depicted and described in my above-identified application, not be exceeded. The prior art has not recognized the consequences of non-monitoring of filter condition during the above circumstances.

SUMMARY OF THE INVENTION

In accordance with the invention, a modified detector system and method are provided, such system monitoring the capacity of the filter assembly. Such modified detector system includes a sensor circuit for measuring pressure drop across the filter assembly in a natural gas piping network owned by the end user-customer, that comprises:

(i) a pressure resistive sensor for sensing differential pressure within the natural gas piping network at locations upstream and downstream of the filtering assembly by generating first and second signals wherein a differential signal thereof relates to the magnitude of sensed differential pressure of the natural gas at the two upstream and downstream locations relative to the filler assembly, (ii) an adjustment circuit connected to said pressure resistive sensor for receiving said first and second signals and providing a response output signal having a desired magnitude variation characteristic as a function of pressure and temperature as well as indicates filter capacity of the filter assembly, (iii) said adjustment circuit including resistive means for adjusting (a) span of said desired output signals as a function of differential pressure, (b) absolute offset of said output signal with respect to said first and second signals and (c) temperature dependent resistive coefficient of variation of both of said offset and said span based on measured temperatures of the upstream and downstream natural gas within the end user-customer's piping network, the temperature dependent resistive coefficient of variation also indicative of the filtering capacity of the filter assembly within the natural gas piping network owned by the end user-customer.

The method of the invention including the steps of:

(a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the natural gas stream coupled with surprising longevity of the in situ contaminant, are filtered from the gas stream and captured, (b) passing an unfiltered sample of natural gas stream and a filtered sample of such stream to the detector system of the invention wherein capacity of the filter assembly located within the end user-customer's piping network is indicated, (c) activating an indicating means to indicate to the end user-customer the need to change the filter within the filter assembly, by generation of a drive signal whereby inappropriate and unsafe operations of customer's appliances are avoided.

DESCRIPTION OF THE DRAWINGS

FIG. I is a side view of the detection system of the present invention positioned within the end user's internal piping system adjacent to a filtering assembly, such system including a transducer signal compensating circuit in series with an alarm circuit through a comparison circuit.

DESCRIPTION OF A PREFERRED EMBODIMENT

Figure 1:
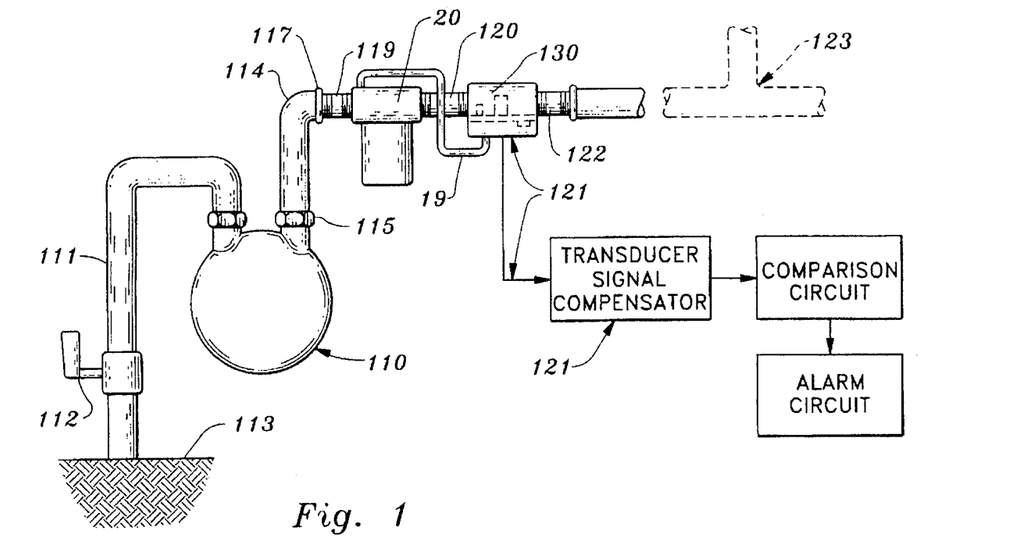

FIG. 1 illustrates a gas meter 110 connected via upright gas pipe 111 and ON-OFF valve 112 to a main gas line network (not shown) downstream of the meter 10 below the earth's surface 113. Upstream of the meter 110 is a elbow 114 having a first end 115 connected to the meter 110 and a second end 117 connected to filter assembly 20 through a fitting 119. The filter assembly 20 in turn connects via outlet fitting 120 to a detection system 121. The leak detection circuit 121, in turn, connects to inlet pipe 122 of the end-user's internal piping system generally indicated at 123.

In operation, when valve 112 is open, the filter assembly 20 and detection system 121 operate in tandem as described in detail below, but when the valve 112 is deactivated, the natural gas flow to the filter assembly 20 and the detection system 121 is interrupted. The purpose of stopping gas flow as described above: to service the filter assembly 20. However with interruption of the gas flow, the detection system 121 is also deactivated as explained below.

Figure 7:
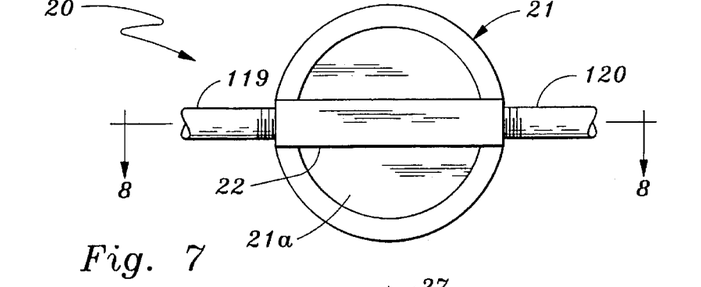
FIG. 7 is a top view of the filtering assembly of the invention.
Figure 8:
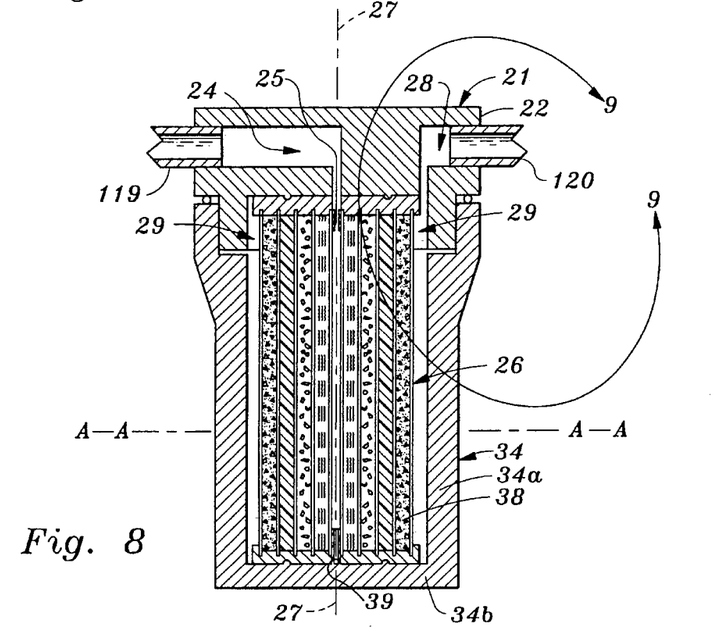
FIG. 8 is a section taken along line 8—8 of FIG. 7.
Figure 9:
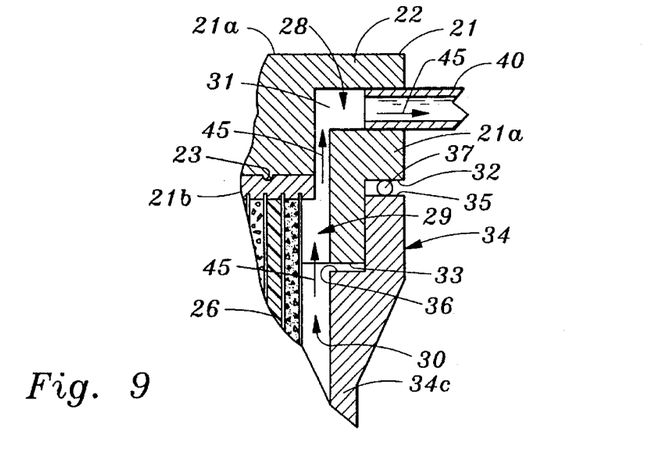
FIG. 9 is a enlarged detail view taken along line 9—9 of FIG. 8.

FIGS. 7, 8 and 9 show the filter assembly 20 in more detail.

As shown, the filter assembly 20 includes a cap 21 fitted with a rectangularly cross-sectioned dome 22 at its upper surface 21a, see FIGS. 8 and 9, to which the pipe fittings 119 and 120 attach. The cap 21 also has a lower surface 21b fitted with nipples 23 adjacent to a series of passageways that allow entry and egress of the gas stream: (i) inlet passageway 24 is L-shaped, is threadably connected to the inlet fitting 119 at one end of the inlet passageway 24. At a central region of the passageway 24, an inlet tubing element 19 extends radially therefrom in order to sample unfiltered amounts of the natural gas stream for the detection system 121, see FIG. 1. And the far end of the passageway 24, the passageway 24 is shown to connect via central annulus 25 to an interior filter media unit generally shown at 26 where media unit 26 is concentric of vertical axis of symmetry 27; (ii) an outlet passageway 28 that is bulbous over region 29 but in fluid contact with annular gathering region 30 that runs the full exterior of the filter media unit 26; the passageway 28 is then swedged over region 31 (in a L-shaped output form) at one end of bulbous region 29 for connection to outlet fitting 120.

The cap 21 also has an annular side wall 21a, see FIG. 9, and inwardly swedged at shoulder 32 and terminates at end 33. It is threaded therebetween to engage with cylindrical canister 34. The canister 34 includes a side wall 34a offset from the filter media unit 26 to form the annular gathering region 30 previously described and in addition, has shoulders 35 and 36. The region between the shoulders 35, 36 is threaded to engage cap 21. Between shoulders 32 and 35 of the cap 21 and canister 34, respectively, is grooved O-ring 37 to prevent gas leakage exterior of the filter assembly 20. The lengths of the engaging threaded portions of the cap 21 and canister 34 are constructed so that positive contact exists only at the O-ring 37 and not at shoulders 33, 36.

Canister 34 also includes a bottom wall 34b. The bottom wall 34b includes upwardly projecting nipples 38 concentric of central annulus 39. The latter attach to the filter housing 26. The purpose of the nipples 23 and central annulus 25 of the cap 21 as well as that of the nipples 38 and central annulus 39 of the canister 34 is to fixedly receive and hold the filter media unit 26 relative to the cap 21 and canister 34.

Note that the direction of the gas stream at the interior of the filter assembly 20 is as taught by arrows 45, see FIG. 9. Such gas stream cannot pass directly from inlet passageway 24 to outlet passageway 28 but is prevented to such flow due to the length of the annuli 25, 39. Thus the gas flow is in a radially expanding, sinusoidal pattern normal to the axis of symmetry 27 about horizontal axis A—A of the filter media unit 26. The pattern begins at the axis of symmetry 27 and progresses through filter media unit 26, and ends exterior of the latter at annular gathering region 30. Thus the natural gas contaminants are filtered from the stream.

Figure 10:
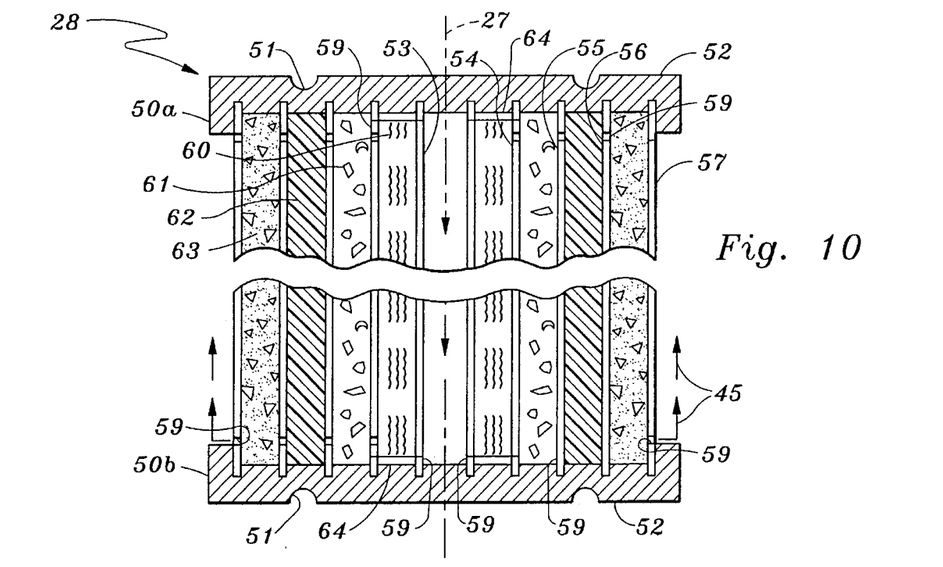
FIG. 10 is an enlarged detail of the filter media unit of FIG. 8.

FIG. 10 illustrates filter media unit 26 in more detail.

As shown, the filter media unit 26 includes end pieces 50a, 50b each having a circular notch 51 at outer surface 52 into which nipples 23, 38 of the cap 21 and canister 34, respectively, are received. Such construction permits the end pieces 50a, 50b to take up firm surface contact with the cap 21 and the canister 34 as the cap 21 is threaded to the latter.

Interior of the end pieces 50a, 50b are a series of concentric tubes 53, 54, 55, 56 and 57 fitted into the notches 51 of the former. The tubes 53—57 have side walls fitted with perforations 59. The side walls are normal to the horizontal axis of symmetry A—A previously mentioned, the latter being also normal to the vertical axis of symmetry 27. The perforations 59 permit gas flow in the sinusoidal-like, single pass filtering manner relative to axis A—A within the tubes 53–57 as indicated by arrows 45. As shown these arrows 45 begin near the vertical axis of symmetry 27 and serpentine outwardly in sinusoidal fashion through the filter media unit 26.

Note that between the tubes 53 and 54; between tubes 54 and 55; between tubes 55 and 56 and between tubes 56 and 57 are separate filter medium 60, 61, 62 and 63 together forming a four-stage, single pass filtering media which in combination remove all traces of the contaminants from the gas stream. The media 60–63 are each selected to remove contaminants from the stream in progressive fashion, viz., from microscopic to millimicrospic levels via single passage of the gas stream through each medium 60–63. However, the media 60–63 do not filter the methane from the gas stream.

FILTER MEDIUM 60

Figures 11, 12:
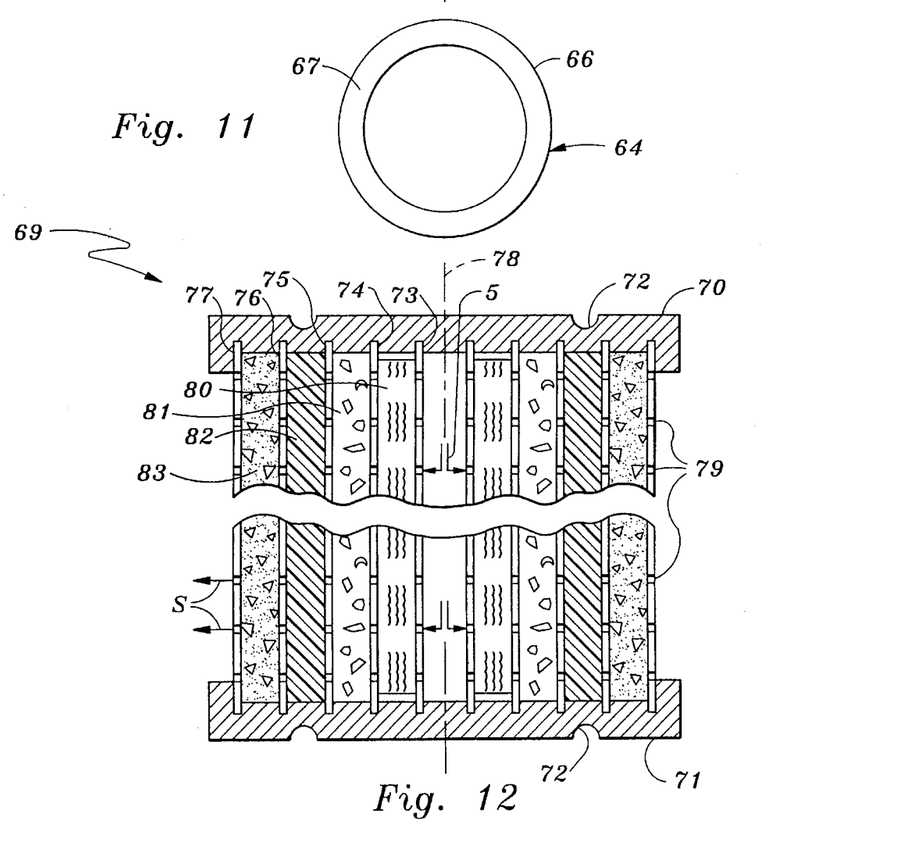
FIG. 11 is an enlarged detail of an insert ring used in the filter media unit of FIG. 8.
FIG. 12 i s an alternate design for the filter unit of FIG. 8.

In this regard, filter medium 60 is preferably pleated filter paper having the following characteristics. Pleated filter paper 60 is widely available, performs impingement, absorption and adsorption and is made by conventional manufacturing processes including but not limited to methods involving weaving of cellulose, wool, acrylic, rayon fibers into corrugated sheet form. The tips and troughs of the corrugated pleated filter paper 68 of FIG. 10 are located in accordion fashion across and within the tubes 53, 54 but not in contact with the upper and lower end pieces 50a, 50b of the filter media unit. As shown in FIG. 11, a separate ring 64 is fitted in contact with each end piece 50a, 50b. The ring 64 of rectangular cross section, includes side wall 66 and terminating broad surface 67, that is compressively fitted in snug contact with the upper or lower end piece 50a, 50b. As a result, the gas stream can circulate in the manner shown and pass through the pleated filter paper 60 in single pass fashion between inlet and outlet perforations 59 associated therewith.

The density of paper 60 varies to provide filtering of the contaminants carried on dust, rust, dirt, moisture and oil laden particles in a range of 40 to 750 microns. It also retains both oils and moisture.

FILTER MEDIUM 61

In this regard, filter medium 61 is preferably silica gel in crystalline form located between tubes 54 and 55.

Silica gel 61 is a conventional drying and dehumidifying agent formed of amorphous silica in crystalline form for filtering and trapping the odorant transported in solution with water, in gaseous form as well as aboard smaller diametered dirt and dust particles carrying contaminants piggyback. The gel absorbs moisture within the gas stream but not oils and is located between tubes 54 and 55. The medium 61 provides for single passage filtering operations only.

Calculations associated with the above are as follows:
AVERAGE NATURAL GAS USAGE Assume average gas use is 125 MSCF/YR, then per month usage cubic meters is 125 mcf/yr12=10,416.6 cu. ft/month/35.3×295 cu. meters/month Assume the area between tubes 54, 55 is a function of a mean diameter of 3⅝ inches, a height of 5 inches and thickness of 0.875 inches, then
Filter volume=52.5 cu. inches;

FILTER MEDIUM 62

Filter medium 62 is preferably open pore polyurethane foam for capturing gas contaminants in gaseous form. Filter medium 62 filters by impingement and adsorption and retains micro vapors and solid particulates including oils and is located between tubes 55 and 56 for single pass filtering operations. It has the following characteristics.
Shape: Cylindrical shape from sheet form
Cellular Matrix Structure
  Medium density—0.1 to 0.4 g/cu. cm matrix solid foam to
  Porosity—0.14 to 0.41 (i.e. 70% to 90% open pore polyurethane
  Sample Period—2 months AT 100% Retention
    Well below breakthrough volume, viz., the point at which concentration of solute in the column effluent is half the concentration introduced into the column.
  Volatility—Medium, See below
  Preparation—Cut from foam sheets; air dry; install.
  Pressure Drop—0.015 psi
Calculations associated with the above are as follows:
Assume average gas use is 125 MSCF/YR, then per month usage cubic meters is 125 mcf/yr12=10,416.6 cu. ft/month/35.3=295 cu. meters/month where: 0.0364 micro g/cu. meter per meter is gas odorant;
  Hence: 295 cu. meter/month produces 10.738 micro g/mo of gas odorant;
  And: 0.0027612 cu. cm required to remove above am't of gas odorant
  Filter volume=408.28 cu. cm via 5 inches height by ½ inches thickness by 15.7 inches long;
  Efficiency—700 cu. meters available
  Change frequency= well within above pattern

FILTER MEDIUM 63

Furthermore, filter medium 63 is preferably granular activated charcoal located between tubes 56 and 57 for single pass filtering operations.

Granular activated charcoal is a conventional filtering medium, performs filtering on liquids, gases and solid particulates down to 10 Angstroms in size (but does not retain water) by impingement and adsorption and is prepared by carbonization of raw materials such as wood, coconut shell and coal. It attracts and holds the gas contaminants irrespective of the mode of transport such as a liquid or gas alone or piggyback aboard dirt and particles as well as with liquid plugs.
  Physical properties:
  Surface Area=600 to 1050 cubic meters per gm Density=0.92 to 2.0 grams per cubic meter
Effective size=0.8 to 1.5 mm
Pore volume=0.6 to 1.7 cubic cm per gram
Mean diameter=1.2 to 1.7 mm
Sleve Size=No. 8 to No. 40 (U.S. Series)
Iodine No.=650 to 1,000

Calculations associated with the above are as follows:
Assume average gas use is 125 MSCF/YR, then per month usage cubic meters is 125 mcf/yr/12=10,416.6 cu. ft/month/35.3=295 cu. meters/month Assume the area between tubes 54, 55 is a function of a diameter of 7 inches, a height of 5 inches and a thickness of 0.5 inches, then Filter volume=55. cu. inches;
Density of GAC=0.30 oz./cu. in
GAC Aviail=16.5 oz.

Requirement to remove gas contaminants associated with 295 cu. meters is well within above change pattern.

Figure 2:
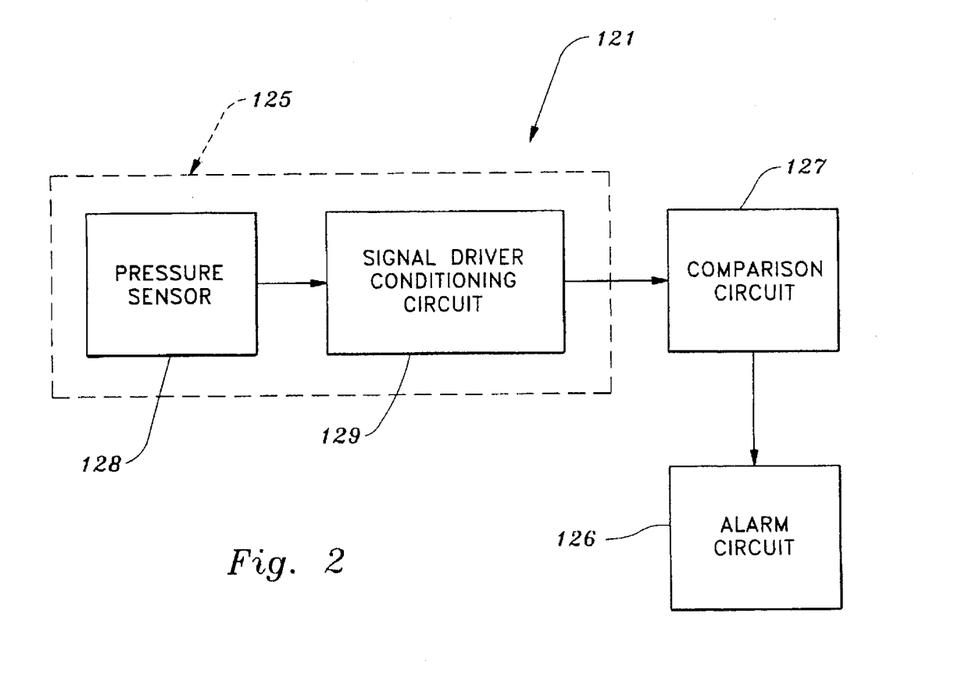
FIG. 2 is a schematic diagram of the detection system of FIG. 1, that illustrates the transducer signal compensating circuit in more detail that includes a pressure senor-transducer in combination to a signal driver conditioning circuit.
Figure 3:
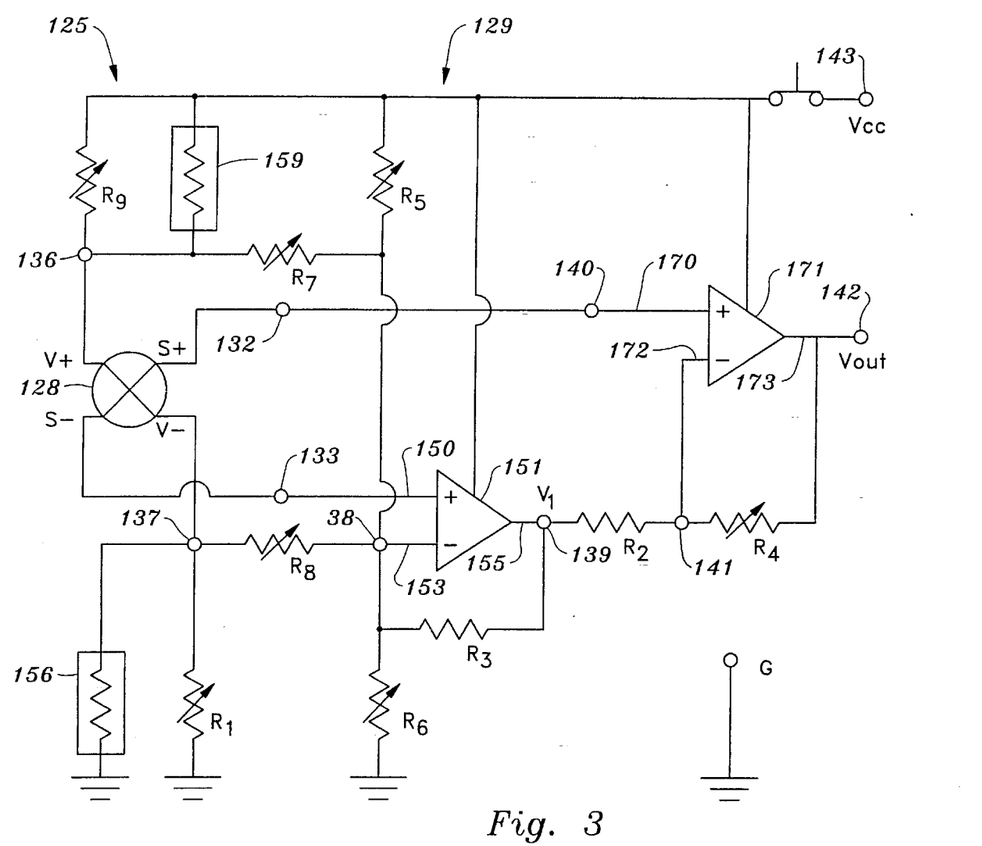
FIG. 3 is a schematic circuit diagram of the detection system of FIG. 2.
Figure 4:
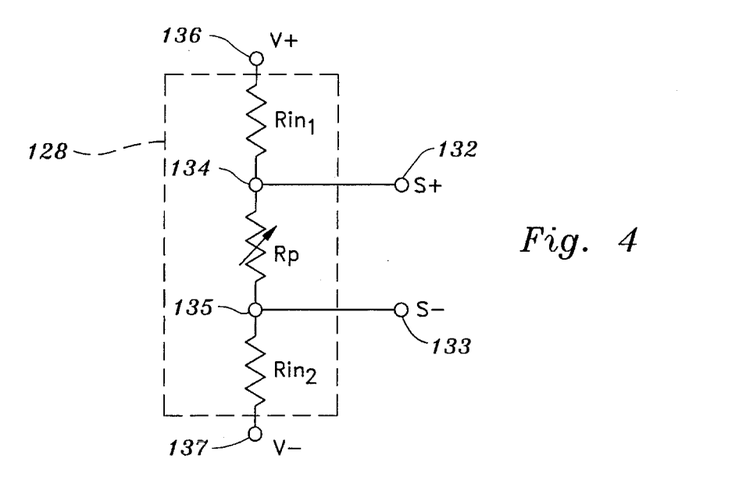
FIG. 4 is a schematic equivalent circuit diagram of the detection system of FIG. 3.

FIG. 2, 3 and 4 illustrate the detection system 121 of the invention in more detail.

As shown in FIG. 2, the system 121 includes a pressure senor-transducer and signal compensating circuit generally indicated at 125 connected to an alarm circuit 126 through a caparator circuit 127. As indicated below, the pressure sensor and signal compensating circuit 125 includes a pressure sensor 128 operationally connected to a signal driving and conditioning circuit 129. Each of the above circuits will be now described in detail.

FIG. 3 shows the pressure sensor 128 and the driving and conditioning circuit 129 of the pressure sensor transducer and signal compensating circuit 125 in more detail.

As shown the pressure sensor and signal compensating circuit 125 includes pressure sensor 128 for sensing differential pressure within a sensing pipe housing 130, see FIG. 1, through which is flowing natural gas and in response to both sampling the stream provide both unfiltered and filtered gas samples thereto, providing a first sensor voltage signal S+ and a second voltage sensor signal S−. These signal S+ and S− appear at first and second output terminals 132 and 133, respectively. The differential voltage between S+ and S−, is directly related to sensed differential pressure within the sensing pipe housing 130 of FIG. 1 as explained below.

Preferably, the sensor 128 is a piezoresistive pressure sensor. FIG. 4 illustrates a typical equivalent circuit thereof. As shown, the sensor 128 is seen to be equivalent to a pressure variable resistor Rp connected in series with non-pressure variable resistors Rin1 and Rin2. The resistor Rp is seen to be located between terminals 134 and 135 which, in turn, are coupled to output terminal 132, 133, respectively, where the signals S+ and S− appear and across which differentially applied voltage of V+ and V− is applied via terminals 136, 137. It should be noted that while a series equivalent circuit for the sensor 131 is illustrated in FIG. 4, another schematic illustrations would be a bridge configuration. In such a bridge circuit a pressure independent resistor is connected with a pressure variable resistor with a voltage differential of V+ and V− applied across the bridge then provides a differential output of S+ and S− across output terminals 132, 133. Regardless of which equivalent circuit is utilized to depict the pressure sensor 128, the operation of the driving and conditioning circuit 129 of the pressure sensor transducer and signal compensating circuit 125 is identical. Again referring to FIG. 3, the sensor voltage signal S− is directly connected to anon-inverting input 150 of a first operation amplifier 151. The terminal 137 at which the applied voltage V− is provided, is connected through an adjustable resistor R8 to a terminal 138 which, in turn, is coupled to inverting input 153 of operational amplifier 151. Output 155 of the amplifier 151 connects to terminal 139 which is also connected through a negative feedback resistor R3 to terminal 138 and through a resistor R2 to terminal 141. The signal from the operational amplifier 151 appearing at output 155 and terminal 139 is designated V1 to indicated that this is an intermediate voltage signal, such signal V1 being directly related to the sensor output voltage signal S− Terminal 138 is connected to ground through a variable resistor R6 and, in addition, is connected to a positive source of fixed voltage potential Vcc via terminal 143 through a variable resistor R5 and a switch 148. The switch 148 that is located adjacent to terminal 143, provides ON-OFF conditions for the circuit 125. The terminal 137 is connected to ground through the parallel combination of an adjustable resistor R1 and negative temperature coefficient thermistor 156 associated with the temperature of the gas sample. The terminal 136 is connected to the terminal 139 through a variable resistor R7 and is connected to the terminal 143 through the parallel combination of a variable resistor R9 and a positive temperature coefficient thermistor 156.

Figure 5:
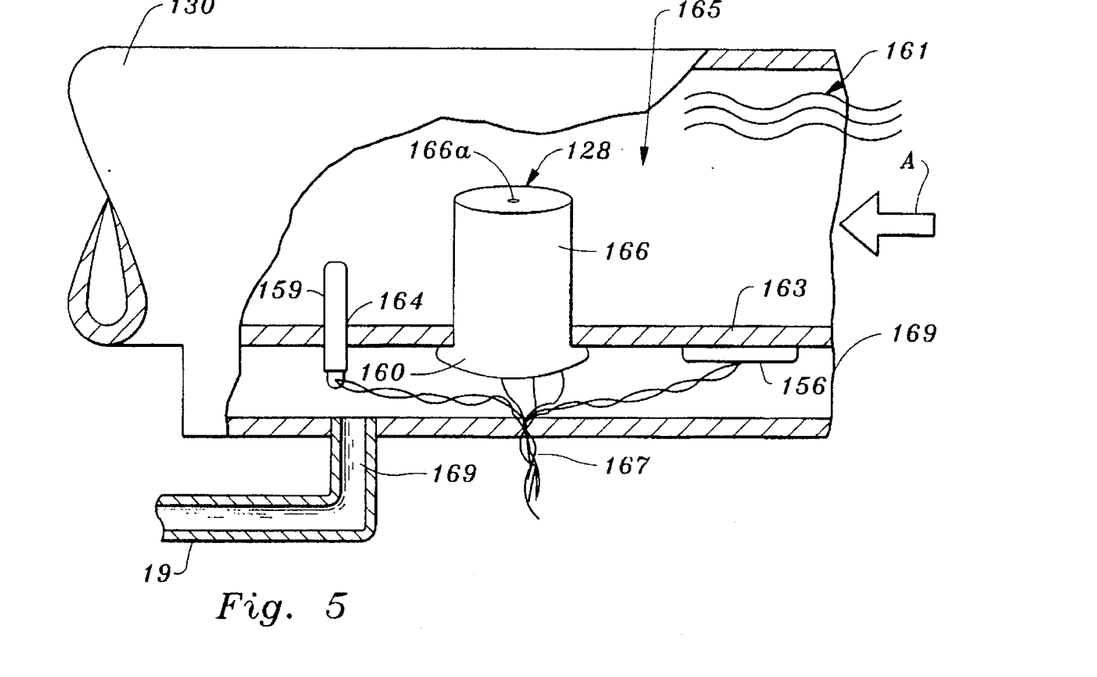
FIG. 5 is a detail side view of a gas piping system of FIG. 1 illustrating the positioning of selected elements of the detection system of FIG. 2 therein.

FIG. 5 illustrates the positioning of the negative and positive temperature coefficient thermistor 156 relative to sensing pipe housing 130 carrying natural gas generally indicated at 161. As shown, thermistor 156 attaches to side wall 163 of the pipe housing 160 and terminates within cavity 165. In that way, thermistor 156 is responsive to the temperature of the natural gas 161 within the end-user's piping system.

In addition, in FIG. 5 note that sensor 128 includes elongated cylindrical housing 166 that has a central entryway 166a in pressure contact with filtered natural gas that flows in the direction of arrow A. At the opposite end, the housing 166 is also provided with a second opening (not shown) adjacent to dome 160 in pressure contact with unfiltered natural gas entering the housing 130 at opening 189. Such entryways permits both unfiltered and filtered gas samples to enter on two sides of the diaphragm (not shown) housed within the housing 166 of the sensor 128 whereby differential pressure between the unfiltered and filtered samples of natural gas 161 is determined. Wiring harness 167 couples the thermistor 156 and the sensor 128 to the remaining circuit elements of the driving and conditioning circuit 129 of the pressure sensor transducer and signal compensating circuit 125 of FIG. 3.

Returning to FIG. 3, note that the sensor output signal S+ appearing at terminal 132 is connected to a terminal 140 and thence to non-inverting input 170 of a second operational amplifier 171 which has an inverting input 172 directly connected to the terminal 141. Output 173 of the amplifier 171 is seen to connect to terminal 142 and to variable feedback resistor R4 and thence to terminal 141. The signal at the terminal 142 is designated as Vout and has been provided with a desired pressure and temperature variation characteristic that takes into account the operational and temperature variations within the environment of the sensor 28, and more specifically takes into account the fact that a low gas flow provides a temperature variation within the thermistor 156 which is reflected in such characteristic.

Note that the pressure transducer and signal compensating circuit 125 implements all needed signal adjustments as well as reflects small temperature changes due to low gas flows within piping network of the end-user, such that output signal Vout has a desired pressure and temperature characteristics. That is, the resistor R9 and R1 associated with the operations of thermistor 156 are used to adjust the temperature coefficient of the span (gain). The resistors R7 and R8 also associated with the operation of the thermistor 156 in the positive sense are used to adjust the temperature coefficient of the offset for the output signal Vout due to any non-pressure related difference between the signals S+ and S−. This is referred to as the temperature coefficient offset adjustment. The variable resistor R4 is used to adjust the absolute value of the span or gain. The resistor R5 and R6 are used to adjust the absolute value of offset. Once such adjustments—as noted above—in resistance levels are occurred, it has been found that accurate levels of gas flows can be indicated by small changes in the output of thermistor 156.

Note that the circuit 125 of FIG. 3 can be shown to define a transfer function that is set forth in my above-identified application. In that transfer function, for a common mode gain of zero, the voltage Vout should only be a function of the difference between S+ and S−, since any equal shift of S+ and S− in the same direction should cancel out.

Figure 6:
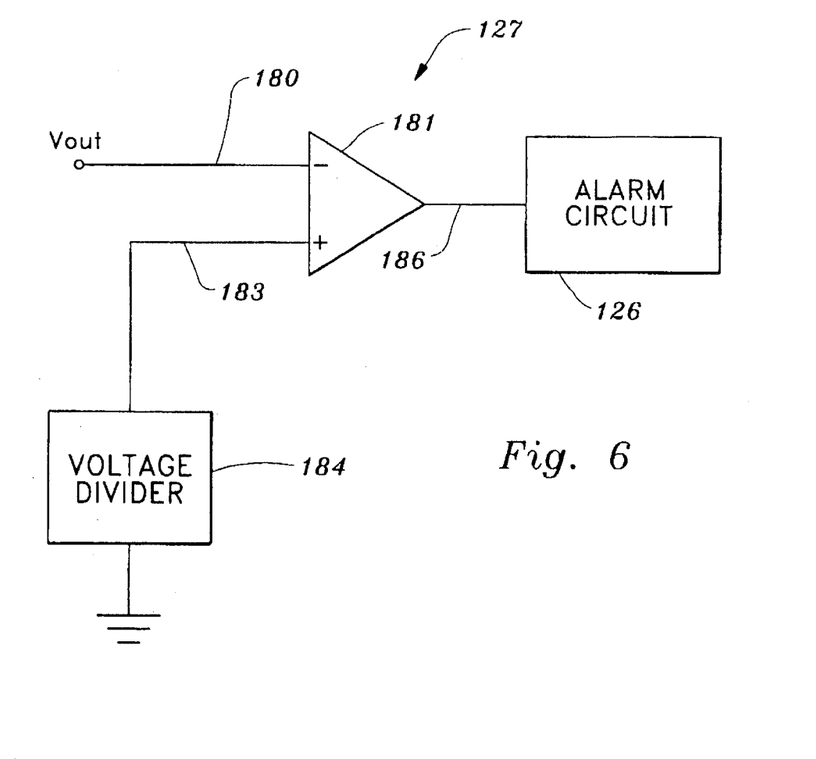
FIG. 6 is a detail schematic circuit diagram of the comparator circuit of FIG. 2

FIG. 6 shows the comparator circuit 127 in more detail. The final process signal Vout is process by the circuit 127 as follows. The signal Vout is first conditioned to be a positive going signal and is then used to drive inverting input 180 of operational amplifier 181. The amplifier 181 is operating as a conventional comparator. Note that such amplifier 181 has non-inverting input 183 connected to ground through a conventional voltage divider 184 to establish a set point level whereby when the inverting signal Vout at inverting input 180 of the amplifier 181 is below the set point level, output 186 of the amplifier 181 goes HI to drive conventional alarm circuit 126 which can be a visual, audio or other type of alarm circuit to alert the end-user of the need to change the filter within the filter assembly 20 of FIG. I. That is, since the alarm circuit 126 is conventional in the art, its descriptions will be dispensed with here.

The above description contains several specific embodiments of the invention. It is not intended that such be construed as limitations on the scope of the invention, but merely as examples of preferred embodiments. Persons skilled in the art can envision other obvious possible variations within the scope of the description. For example, a current output signal rather than a voltage output signal Vout can be used, such current signal retaining the basic principles disclosed and claimed herein. Hence the scope of the invention is to be determined by the appended claims and their legal equivalents.

What is claimed is:

1. A sensor circuit for indicating an upstream filter capacity of a filter assembly in an end user-customer's piping network, comprising, a pressure resistive sensor for sensing differential pressure within a natural gas piping network owned by the end user-customer between unfiltered and filtered samples of natural gas flowing therein, by generating first and second signals associated therewith wherein a differential signal thereof relates to the magnitude of sensed differential pressure of said samples of natural gas, an adjustment circuit connected to said pressure resistive sensor for receiving said first and second signals and providing a response output signal having a desired magnitude variation characteristic as a function of pressure and temperature as well as indicates flow rate of natural gas within the piping network, said adjustment circuit including resistive means for adjusting (i) span of said desired output signals as a function of differential pressure, (ii) absolute offset of said output signal with respect to said first and second signals and (iii) temperature dependent resistive coefficient of variation of both of said offset and said span based on the measured temperature of the natural gas, said temperature dependent resistive coefficient of variation also indicative of natural gas flow within an end-user' domain.

2. The sensor circuit of claim 1 in which said adjustment circuit includes first and second operational amplifiers, said first operational amplifier having a non-inverting input coupled to said sensor, an inverting input and an output, said second operational amplifier having an inverting input coupled to said output of said first operational amplifier, an non-inverting input and an output on which said pressure related output signal is generated.

3. The sensor circuit of claim 2 in which said adjustment circuit includes first offset adjustment resistor means connected to said inverting input of said second operational amplifier.

4. The sensor circuit of claim 3 in which said pressure resistive sensor comprise a piezoresistive pressure sensor.

5. The sensor circuit of claim 4 in which said adjustment circuit includes temperature sensitive resistor means connected to inverting input of said first operational amplifier, said temperature sensitive resistor means including a thermistor in series with said inverting input, said thermistor having a resistive coefficient of variation that is based on measured temperature of the natural gas samples, as well as being indicative of the occurrence of natural gas flow within an end-user's domain.

* * * * *